United States Patent
Wippler

(10) Patent No.: US 9,749,734 B2
(45) Date of Patent: Aug. 29, 2017

(54) AUDIO SYSTEM WITH REMOVABLE SPEAKER

(71) Applicant: Toyota Motor Engineering & Manufacturing North America, Inc., Erlanger, KY (US)

(72) Inventor: Erik Anthony Wippler, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/792,204

(22) Filed: Jul. 6, 2015

(65) Prior Publication Data

US 2017/0013349 A1    Jan. 12, 2017

(51) Int. Cl.
| | |
|---|---|
| H04B 1/00 | (2006.01) |
| H04R 5/02 | (2006.01) |
| H04R 1/26 | (2006.01) |
| H04R 3/12 | (2006.01) |
| H04S 7/00 | (2006.01) |
| H04R 1/02 | (2006.01) |
| H04S 3/00 | (2006.01) |
| B60R 11/02 | (2006.01) |
| H04S 1/00 | (2006.01) |

(52) U.S. Cl.
CPC .............. *H04R 1/26* (2013.01); *H04R 3/12* (2013.01); *H04R 5/02* (2013.01); *H04S 7/308* (2013.01); *B60R 11/0217* (2013.01); *H04R 1/025* (2013.01); *H04R 1/026* (2013.01); *H04R 2420/05* (2013.01); *H04R 2420/07* (2013.01); *H04R 2499/13* (2013.01); *H04S 1/002* (2013.01); *H04S 3/00* (2013.01)

(58) Field of Classification Search
CPC .... H04R 1/26; H04R 1/026; H04R 2201/025; H04R 2420/07; H04R 2499/13; H04R 5/02; H04S 1/002; H04S 3/00; B60R 11/0217
See application file for complete search history.

(56) References Cited

U.S. PATENT DOCUMENTS

| | | | |
|---|---|---|---|
| 6,359,987 B1 | 3/2002 | Tran et al. | |
| 7,792,310 B2 | 9/2010 | Lee et al. | |
| 8,059,830 B1 * | 11/2011 | Gleason | H04R 5/04 381/86 |
| 8,082,051 B2 | 12/2011 | Mihelich et al. | |
| 2004/0247141 A1 * | 12/2004 | Holmi | H04S 7/307 381/86 |
| 2008/0123870 A1 * | 5/2008 | Stark | H04B 1/082 381/86 |
| 2013/0039527 A1 * | 2/2013 | Jensen | H04R 1/24 381/387 |
| 2013/0259283 A1 * | 10/2013 | Gengler | H04R 1/00 381/334 |

* cited by examiner

*Primary Examiner* — Andrew L Sniezek
(74) *Attorney, Agent, or Firm* — Dinsmore & Shohl LLP

(57) ABSTRACT

An audio system for use in an automotive vehicle is provided. The audio system is configured to detect the removal of the removable speaker and adjust the audio signal to the fixed speakers so as to maintain the quality of sound within the vehicle. The audio system includes a signal processor configured to detect the presence of the removable speaker. The audio system distributes the frequency transmitted to the removable speaker to the speakers within the automotive vehicle so as to maintain the same sound quality when the removable speaker is removed.

19 Claims, 3 Drawing Sheets

AUDIO SYSTEM WITH REMOVABLE SPEAKER

FIELD OF THE INVENTION

An audio system for use in an automotive vehicle having a removable speaker and a plurality of fixed speakers is provided. In particular the audio system is configured to detect the removal of the removable speaker and adjust the audio signal to the fixed speakers so as to maintain the quality of sound within the vehicle.

BACKGROUND OF THE INVENTION

Removable speakers for use in an automotive vehicle are known. The removable speaker may be removed from the automotive vehicle and used outside of the automotive vehicle. Such a feature may be used by the consumer to enhance an outdoor event such as a picnic.

However, the removal of the speaker may distort sound quality within the automotive vehicle. In particular, automotive vehicles are preprogrammed to a factory setting so as to have a predetermined audio profile. Thus, the removal of the speaker distorts the sound quality. Accordingly, it remains desirable to have an audio system which can maintain the quality of sound when a speaker is removed.

SUMMARY OF THE INVENTION

An audio system for use in an automotive vehicle is provided. The audio system includes a plurality of speakers. Some of the speakers are fixed speakers and at least one is removable. The fixed speakers are fixedly mounted within the cabin space of the automotive vehicle. The removable speaker is configured to be removed from the automotive vehicle and to be used as a speaker independently of the automotive vehicle.

The audio system further includes a signal processor. The signal processor is in electrical communication with each of speakers and may be configured to detect the presence of each of the speakers. The signal processor is further configured to transmit a first signal and a second signal.

The first signal is configured to generate a predetermined audio profile when all of the speakers are in electrical communication with the signal processor. The predetermined audio profile may be the factory setting programmed by the automotive manufacturer. The signal processor is further configured to transmit the second signal to each of the fixed speakers when the removable speaker is removed so as to generate the predetermined audio profile. Accordingly, the sound quality within the automotive vehicle is maintained when the speaker is removed.

For instance, some of the fixed speakers may be door speakers fixedly mounted to each door of the automotive vehicle. The door speakers may be woofers. The removable speaker may be what is commonly known as a subwoofer. The signal processor transmits a first signal when all the speakers are connected. The first signal carries with it a predetermined frequency which is transmitted to the woofer. When the signal processor detects that the removable speaker is removed, the predetermined frequency is then distributed to the door speakers over the second signal and thus the sound quality within the automotive vehicle is maintained when the removable speaker is removed.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE PREFERRED EMBODIMENTS

An audio system for use in an automotive vehicle is provided. The audio system is configured to detect the removal of the removable speaker and adjust the audio signal to the fixed speakers so as to maintain the quality of sound within the vehicle. In particular, the audio system distributes the frequency transmitted to the removable speaker to the speakers within the automotive vehicle so as to maintain the same sound quality when the removable speaker is removed.

Figure 1:
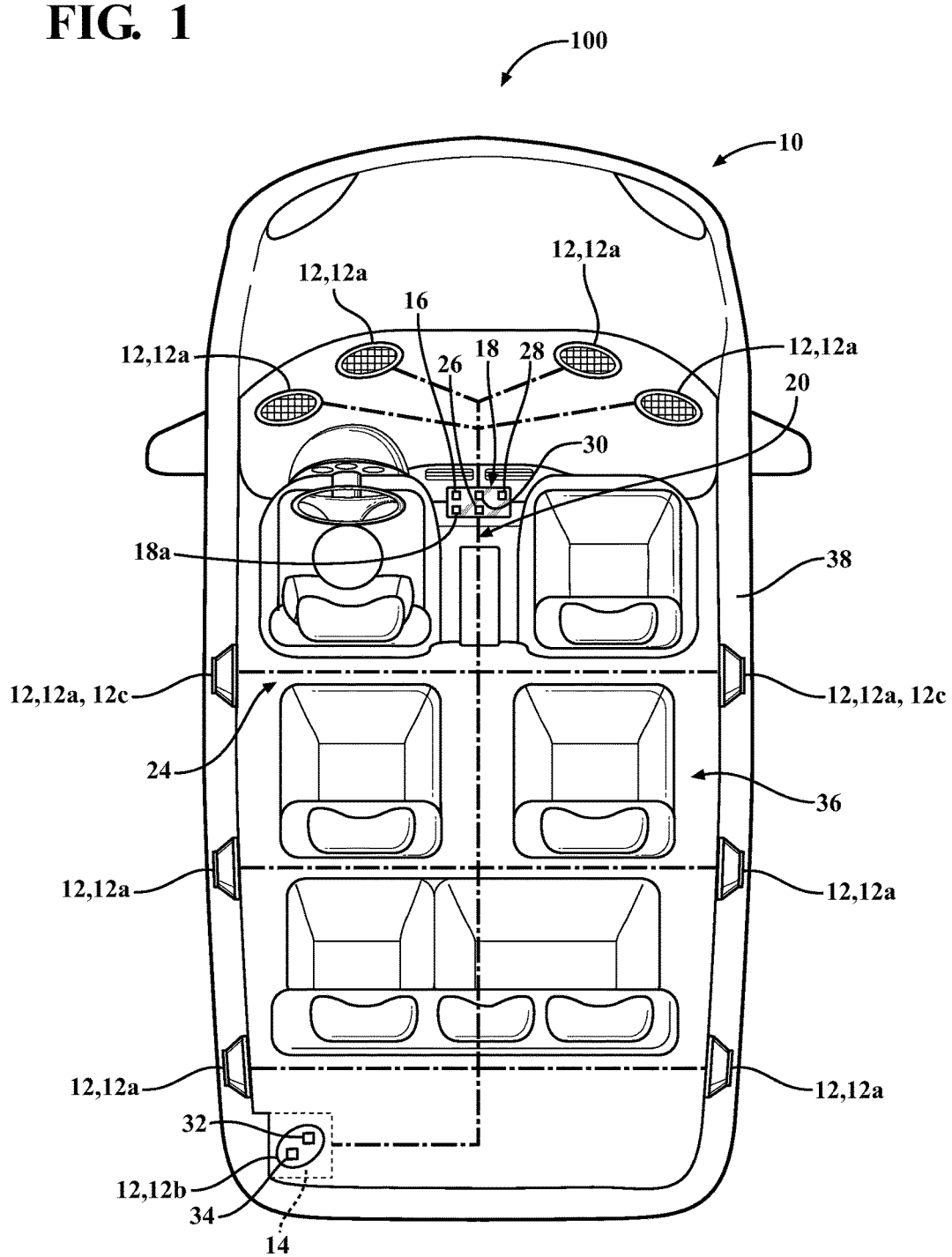
FIG. 1 is a top down view of the automotive vehicle.
Figure 2:
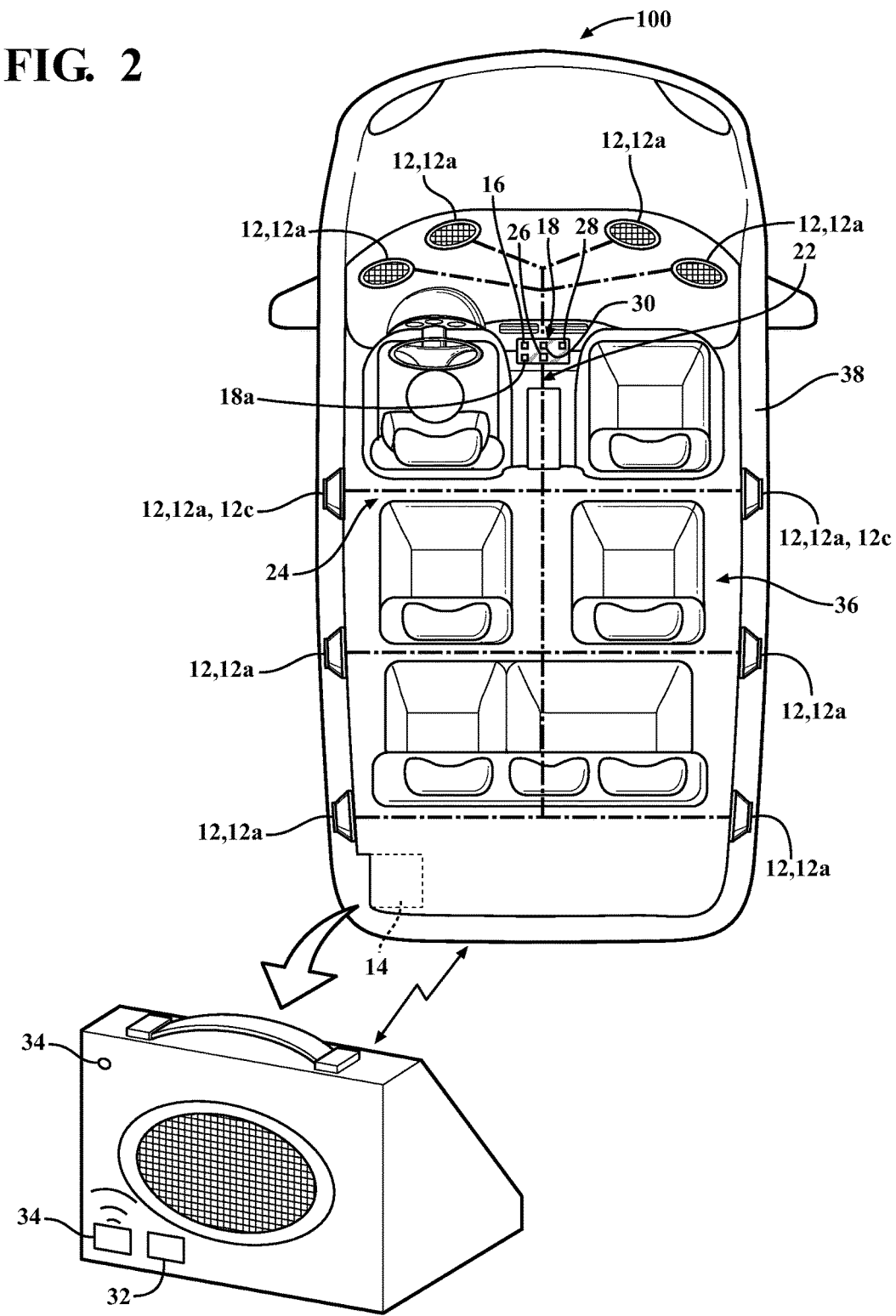
FIG. 2 is a view of FIG. 1 showing the removable speaker removed.

With reference now to FIGS. 1 and 2, the audio system 10 includes a plurality of speakers disposed within the interior space of an automotive vehicle 100. The plurality of speakers 12 include a plurality of fixed speakers 12a and a removable speaker 12b. The fixed speakers 12a are fixedly mounted within the automotive vehicle 100. As shown in FIGS. 1 and 2, the fixed speakers 12a are disposed in multiple locations within the automotive vehicle 100, to include the doors and dashboard.

In particular, each of the fixed speakers 12a may be configured to generate sound within a predetermined frequency. For instance, some of the fixed speakers 12a are configured to generate high audio frequencies, such as between 2,000 Hz to 20,000 Hz. Such speakers are commonly referred to as "Tweeters." Some of the fixed speakers 12a are configured to generate lower frequencies between 40 Hz to 1,000 Hz, such speakers are commonly referenced as woofers, or subwoofers. The tweeters, subwoofers and woofers may be placed in various locations within the automotive vehicle 100 based upon acoustic performance and engineering goals.

The removable speaker 12b is configured to be removed from the automotive vehicle 100. For illustrative purposes, the removable speaker 12b is a subwoofer. The removable speaker 12b may be docked in a docking station 14 disposed within the automotive vehicle 100. The removable speaker 12b may be disengaged from the docking station 14 and used out of the automotive vehicle 100 as shown in FIG. 2.

The audio system 10 further includes a signal processor 16 in electrical communication with each of the plurality of speakers 12. The signal processor 16 may be integrated into the head unit 18 of the automotive vehicle 100 so as to allow the speakers 12 to play an audio file 18a generated from the radio, internet, a portable electronic device, CD or the like. The signal processor 16 is in electrical connection with each of fixed speakers 12a and the removable speaker 12b. The signal processor 16 may be further configured to detect if each of the speakers 12 are electrically connected thereto. The signal processor 16 may do so by determining if a signal from anyone of the speakers absent during signal processing.

Figure 3:
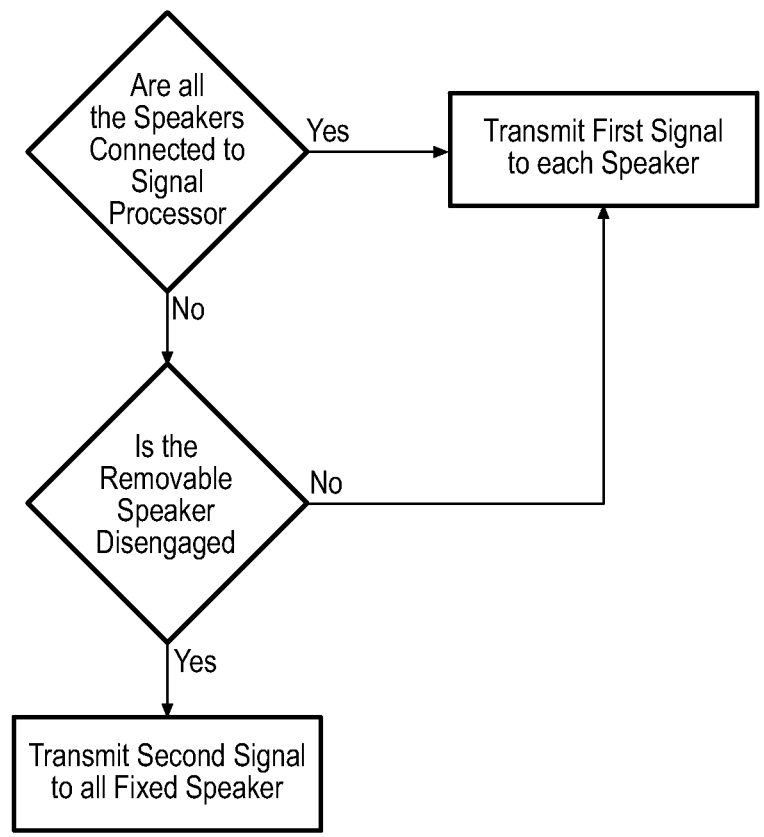
FIG. 3 is a diagram showing the operation of the audio system.

With reference again to FIG. 1 and now to FIG. 3, the operation of the audio system 10 is provided. The signal processor 16 is configured to transmit a first signal 20 and a second signal 22. The first signal 20 is configured to generate a predetermined audio profile 24 when each of the plurality of speakers 12 is in electrical communication with the signal processor 16, as shown by the dashed lines in FIG. 1.

As discussed above, the first signal 20 may be the factory setting for the speakers 12 programmed by the automotive manufacturer. It should also be appreciated that the first signal 20 may be configured to illicit different frequencies depending on the fixed speaker 12a. For instance, some of the fixed speakers 12a may be tweeters disposed on the dashboard and other fixed speakers 12a may be woofers 12c disposed on the door and thus the first signal 20 may be configured to actuate the tweeters at a predetermined frequency range different from the frequency range of the woofers.

It should be appreciated that the signal processor 16 may include an audio input 26 allowing the factory settings to be adjusted according to the preference of the user. For instance, the user may actuate the audio input 26 to increase bass generated by the speakers 12. The second signal 22 is transmitted to each of the fixed speakers 12a when the removable speaker 12b is removed, as shown by the dashed lines in FIG. 3, so as to generate the predetermined audio profile 24. For instance, the second signal 22 may be configured to increase the power to the woofers and tweeters to replace the output of the removable speaker 12b. Accordingly, the audio system 10 maintains the same sound quality when the removable speaker 12b is removed.

With reference now to FIG. 2, the audio system 10 may further include a sensor 28 configured to detect the presence of the removable speaker 12b. The sensor 28 is illustratively shown disposed within the head unit 18 of the automotive vehicle 100. However, it should be appreciated that the sensor 28 may be disposed in other locations and thus the position shown in FIG. 2 is not limiting to the scope of the appended claims. The sensor 28 communicates the presence of the removable speaker 12b to the signal processor 16.

The first signal 20 includes a predetermined frequency which is transmitted to the removable speaker 12b. The second signal 22 is configured to distribute the predetermined frequency among the plurality of speakers 12 electrically connected within the automotive vehicle 100. For example, FIGS. 1 and 2 show the audio system 10 having a pair of door speakers 12c. The door speakers 12c are woofers. The removable speaker 12b is a subwoofer.

The second signal 22 is configured to distribute equally among the pair of door speakers, the predetermined frequency carried by the first signal 20 to the removable speaker 12b. It should be appreciated that in instances where the removable speaker 12b is a subwoofer, the first signal 20 transmitted to the removable speaker 12b is configured to generate a sound having a frequency between 20-200 Hz. Accordingly, it should be appreciated that the second signal 22 transmitted by signal processor to the woofers is configured to distribute the sound attributed to the subwoofer between the two woofers. Thus, the sound quality within the automotive vehicle 100 is maintained when the removable speaker 12b is removed.

The signal processor 16 may include an amplifier 30. The audio input 26 may be disposed on the head unit 18 and may be configured to adjust the frequencies of the predetermined audio profile 24. It should be appreciated that the predetermined audio profile 24 may be programmed to generate a predetermined amount of treble, bass and fade. Accordingly, the audio input 26 may be actuated by the user to adjust the treble, bass and/or fade.

With reference again to FIG. 3, the removable speaker 12b is shown removed from the automotive vehicle 100. The removable speaker 12b may be further configured to operate independently from the automotive vehicle 100. The removable speaker 12b includes a battery 32 configured to power the removable speaker 12b when removed from the automotive vehicle 100.

The removable speaker 12b may further include an input 34 for receiving an audio signal from a media device so as to play an audio file remotely from the automotive vehicle 100. The input 34 may be further configured to receive a wireless audio signal from the automotive vehicle 100 so as to play an audio file generated from the automotive vehicle 100. For instance, the input 34 may be configured to receive a Bluetooth signal from the automotive vehicle 100, and thus music selection may be made using the head unit 18 of the automotive vehicle 100. It should be appreciated that the removable speaker 12b is configured to operate independently as a speaker and thus, a speaker such as subwoofer may be adaptable for use herein.

With reference again to FIGS. 1 and 2, an automotive vehicle 100 having a vehicle cabin 36 and a pair of doors 38 is provided. The automotive vehicle 100 further includes a plurality of speakers 12. The plurality of speakers 12 include a plurality of fixed speakers 12a and a removable speaker 12b. The fixed speakers 12a are fixedly mounted within the automotive vehicle 100. In particular, each fixed speakers 12a may be configured to generate sound within a predetermined frequency. For instance, some of the fixed speakers 12a are configured to generate high audio frequencies, such as between 2,000 Hz to 20,000 Hz. Such speakers are commonly referred to as "Tweeters." Some of the speakers are configured to generate lower frequencies between 40 Hz to 1,000 Hz, such speakers are commonly referenced as woofers, or subwoofers.

The removable speaker 12b is a subwoofer configured to be removed from the automotive vehicle 100. The removable speaker 12b may be docked in a docking station disposed within the automotive vehicle 100. The removable speaker 12b may be disengaged from the docking station and used out of the automotive vehicle 100 as shown in FIG. 2.

The automotive vehicle 100 further includes a signal processor 16 in electrical communication with each of the plurality of speakers. The signal processor 16 may be integrated into the head unit 18 of the automotive vehicle 100 so as to allow the speakers to play audio content from the radio, internet, a portable electronic device, CD or the like. The signal processor 16 is in electrical connection with each of fixed speakers 12a and the removable speaker 12b. The signal processor 16 may be further configured to detect if each of the speakers are electrically connected thereto. The signal processor 16 may do so by determining if a signal from anyone of the speakers is not being processed.

With reference now to FIG. 3, the operation of the automotive vehicle 100 is provided. The signal processor 16 is configured to transmit a first signal 20 and a second signal 22. The first signal 20 is configured to generate a predetermined audio profile 24 when each of the plurality of speakers is in electrical communication with the signal processor 16. As discussed above, the first signal 20 may be the factory setting for the speakers programmed by the automotive manufacturer.

It should be appreciated that the signal processor 16 may include an audio input 26 allowing the factory settings to be adjusted according to the preference of the user. For instance, the user may actuate the audio input 26 to increase bass generated by the audio system 10. The second signal 22 is transmitted to each of the fixed speakers 12a when the removable speaker 12b is removed so as to generate the predetermined audio profile 24. Accordingly, the automotive vehicle 100 maintains the same sound quality when the removable speaker 12b is removed.

With reference now to FIG. 2, the automotive vehicle 100 may further include a sensor 28 configured to detect the presence of the removable speaker 12b. The sensor 28 is illustratively shown disposed within the head unit 18 of the automotive vehicle 100. However, it should be appreciated that the sensor 28 may be disposed in other locations and thus the position shown in FIG. 2 is not limiting to the scope of the appended claims. The sensor 28 communicates the presence of the removable speaker 12b to the signal processor 16.

The first signal 20 includes a predetermined frequency which is transmitted to the removable speaker 12b. The second signal 22 is configured to distribute the predetermined frequency among the plurality of speakers electrically connected within the automotive vehicle 100. For example, FIGS. 1 and 2 show the automotive vehicle 100 having a pair of door speakers 12c. The door speakers 12c are woofers. The removable speaker 12b is a subwoofer. The automotive vehicle 100 further includes a plurality of tweeters fixedly mounted on the dashboard.

The second signal 22 is configured to distribute equally among the fixed speakers 12a. In particular, the second signal 22 may be configured to distribute the low frequency output of the removable speaker 12b among the pair of door speakers 12c and the high frequency output of the removable speaker among the tweeters. Accordingly, it should be appreciated that the signal processor 16 transmits a signal to the woofers and tweeters configured to distribute the sound attributed to the subwoofer among the fixed speakers 12a. Thus, the sound quality within the automotive vehicle 100 is maintained when the removable speaker 12b is removed.

The signal processor 16 may include an amplifier 30. The audio input 26 may be disposed on the head unit 18 and may be configured to adjust the frequencies of the predetermined audio profile 24. It should be appreciated that the predetermined audio profile 24 may be programmed to generate a predetermined amount of treble, bass and fade. Accordingly, the audio input 26 may be actuated by the user to adjust the treble, bass and/or fade.

With reference again to FIG. 3, the removable speaker 12b is shown removed from the automotive vehicle 100. The removable speaker 12b may be further configured to operate independently from the automotive vehicle 100. The removable speaker 12b includes a battery 32 configured to power the removable speaker 12b when removed from the automotive vehicle 100. The removable speaker 12b may further include an input 34 for receiving an audio signal from a media device so as to play an audio file remotely from the automotive vehicle 100.

The input 34 may be further configured to receive a wireless audio signal from the automotive vehicle 100 so as to play an audio file generated from the automotive vehicle 100. For instance, the input 34 may be configured to receive a Bluetooth signal from the automotive vehicle 100, and thus music selection may be made using the head unit 18 of the automotive vehicle 100. It should be appreciated that the removable speaker 12b is configured to operate independently as a speaker and thus, a speaker such as subwoofer may be adaptable for use herein.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination.

I claim:

1. An audio system for use in an automotive vehicle, the audio system comprising:
   a plurality of speakers, the plurality of speakers consisting of a plurality of fixed speakers and a removable speaker, the plurality of fixed speakers fixedly mounted within the automotive vehicle and the removable speaker configured to be removed from the automotive vehicle and used independently outside the vehicle;
   a signal processor in electrical communication with each of the plurality of speakers and configured to detect each of the plurality of speakers, the signal processor configured to transmit a first signal and a second signal, wherein the second signal is different than the first signal, wherein the first signal is configured to generate a predetermined audio profile within said automotive vehicle when each of the plurality of speakers is in electrical communication with the signal processor, the predetermined audio profile is an audio output having a predetermined amount of treble, bass and fade so as to generate a quality of sound, the second signal is transmitted to each of the fixed speakers when the removable speaker is removed so as to generate the predetermined audio profile within said automotive vehicle such that the same quality of sound is generated even when the removable speaker is removed.

2. The audio system as set forth in claim 1, further including a sensor configured to detect the presence of the removable speaker, the sensor communicating the presence of the removable speaker to the signal processor.

3. The audio system as set forth in claim 1, wherein the first signal includes a predetermined frequency, and wherein the second signal is configured to distribute the predetermined frequency among the plurality of speakers electrically connected within the automotive vehicle.

4. The audio system as set forth in claim 3, wherein the plurality of speakers includes a pair of door speakers and the second signal is configured to equally distribute the predetermined frequency to each of the pair of door speakers.

5. The audio system as set forth in claim 3 wherein the predetermined frequency is between 20-200 HZ.

6. The audio system as set forth in claim 1, wherein the signal processor includes an amplifier.

7. The audio system as set forth in claim 1, wherein the removable speaker includes a battery configured to power the removable speaker when removed from the automotive vehicle.

8. The audio system as set forth in claim 1, wherein the removable speaker includes an input for receiving an audio signal from a media device so as to play an audio file remotely from the automotive vehicle.

9. The audio system as set forth in claim 8, wherein the input is further configured to receive a wireless audio signal from the automotive vehicle so as to play an audio file generated from the automotive vehicle remotely from the automotive vehicle.

10. The audio system as set forth in claim 1, wherein the removable speaker is a subwoofer.

11. An automotive vehicle having a vehicle cabin and a pair of doors, the automotive vehicle comprising:
    a plurality of speakers, the plurality of speakers consisting of a plurality of fixed speakers and a removable speaker, the plurality of fixed speakers fixedly mounted within the automotive vehicle and the removable speaker configured to be removed from the automotive vehicle and used independently outside the vehicle;

a signal processor in electrical communication with each of the plurality of speakers and configured to detect each of the plurality of speakers, the signal processor configured to transmit a first signal and a second signal, wherein the second signal is different than the first signal, wherein the first signal is configured to generate a predetermined audio profile within said automotive vehicle when each of the plurality of speakers is in electrical communication with the signal processor, the predetermined audio profile is an audio output having a predetermined amount of treble, bass and fade so as to generate a quality of sound, the second signal is transmitted to each of the fixed speakers when the removable speaker is removed so as to generate the predetermined audio profile within said automotive vehicle such that the same quality of sound is generated even when the removable speaker is removed.

12. The automotive vehicle as set forth in claim 11, further including a sensor configured to detect the presence of the removable speaker, the sensor communicating the presence of the removable speaker to the signal processor.

13. The automotive vehicle as set forth in claim 11, wherein the first signal includes a predetermined frequency, and wherein the second signal is configured to distribute the predetermined frequency among the plurality of speakers electrically connected within the automotive vehicle.

14. The automotive vehicle as set forth in claim 11, wherein the plurality of fixed speakers is a pair of door speakers, each fixedly mounted to a respective one of the pair of doors and the second signal is configured to equally distribute the predetermined frequency to each of the pair of door speakers.

15. The automotive vehicle as set forth in claim 11, wherein the signal processor includes an amplifier.

16. The automotive vehicle as set forth in claim 11, wherein the removable speaker includes a battery configured to power the removable speaker when removed from the automotive vehicle.

17. The automotive vehicle as set forth in claim 11, wherein the removable speaker includes an input for receiving an audio signal from a media device so as to play an audio file remotely from the automotive vehicle.

18. The automotive vehicle as set forth in claim 17, wherein the input is further configured to receive a wireless audio signal from the automotive vehicle so as to play an audio file generated from the automotive vehicle remotely from the automotive vehicle.

19. The automotive vehicle as set forth in claim 11, wherein the removable speaker is a subwoofer.

* * * * *